United States Patent
DeLeeuw et al.

(10) Patent No.: US 6,351,282 B1
(45) Date of Patent: *Feb. 26, 2002

(54) METHOD AND APPARATUS FOR TAKING DIGITAL PICTURES WITH AN INDUSTRY STANDARD FILM CAMERA

(75) Inventors: William DeLeeuw, Hillsboro, OR (US); David Watson, Spanish Fort, UT (US); Puneet Kukkal, Hillsboro, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,486

(22) Filed: Sep. 2, 1997

(51) Int. Cl.[7] .............................. H04N 5/76; H04N 9/47
(52) U.S. Cl. ......................... 348/233; 348/64; 396/429
(58) Field of Search .......................... 348/222, 64, 231, 348/372, 374, 375, 373, 233, 96; 396/429, 535; 358/909.1

(56) References Cited

U.S. PATENT DOCUMENTS

| | | | |
|---|---|---|---|
| 4,728,977 A | * 3/1988 | Yomogizawa et al. | 396/535 |
| 4,814,811 A | * 3/1989 | Saito | 358/909.1 |
| 4,907,231 A | * 3/1990 | Watanabe et al. | 348/232 |
| 4,933,780 A | * 6/1990 | Wash et al. | 358/909.1 |
| 5,040,068 A | * 8/1991 | Parulski et al. | 348/376 |
| 5,142,310 A | * 8/1992 | Taniguchi et al. | 348/96 |
| 5,150,215 A | * 9/1992 | Shi | 348/231 |
| 5,153,729 A | * 10/1992 | Saito | 348/232 |
| 5,159,458 A | * 10/1992 | Murata et al. | 348/233 |
| 5,258,878 A | * 11/1993 | Araki et al. | 358/909.1 |
| 5,452,000 A | * 9/1995 | Sapir | 348/64 |
| 5,477,264 A | * 12/1995 | Sarbadhikari et al. | 348/231 |
| 5,561,458 A | * 10/1996 | Cronin et al. | 348/64 |
| 5,619,257 A | * 4/1997 | Reele et al. | 348/64 |
| 5,633,678 A | * 5/1997 | Parulski et al. | 348/232 |
| 5,805,219 A | * 9/1998 | Ejima et al. | 348/375 |
| 5,978,016 A | * 11/1999 | Lourette et al. | 348/231 |
| 6,122,411 A | * 9/2000 | Shen et al. | 382/299 |
| 6,181,883 B1 | * 1/2001 | Oswal | 396/429 |

* cited by examiner

Primary Examiner—Wendy R. Garber
Assistant Examiner—Aung S. Moe
(74) Attorney, Agent, or Firm—Blakely, Sokoloff, Taylor & Zafman LLP (57) ABSTRACT

A method and apparatus for taking digital pictures. A film camera having a standard back panel, a shutter, and a primary lens is provided. An image sensing array is disposed within the camera in an area normally occupied by film so as to be in optical communication with the primary lens when the shutter is open. A read-out circuit is packaged to reside in a cavity normally occupied by film when the camera is employed to take standard pictures. The read-out circuit is coupled to the image sensing array and reads out an image captured by the image sensing array. A memory is coupled to a read-out circuit to store images read from the image sensing array. The memory is packaged to also reside in a cavity vacated in the absence of film. In one embodiment, the read-out circuit and the memory occupy the same cavity. In another embodiment, the read-out circuit and the memory occupy different cavities.

20 Claims, 9 Drawing Sheets

METHOD AND APPARATUS FOR TAKING DIGITAL PICTURES WITH AN INDUSTRY STANDARD FILM CAMERA

BACKGROUND OF THE INVENTION

(1) Field of the Invention

The invention relates to digital photography. More specifically, the invention relates to providing an industry standard film camera the capacity to take digital pictures.

(2) Related Art

Film cameras have been around for decades. Among the typical cameras available are 35mm, 110, and 660. In the case of 35mm, a film canister is placed inside the cavity within the camera. The film leader is extended across an aperture which is in optical communication with a lens when a shutter is opened. The leader engages a take-up reel. The take-up reel is a core of a second cavity within the camera. As pictures are taken and the film advanced, the film is retained on the take-up reel. Some cameras initially advance all the film onto the take-up reel and then rewind frame by frame as pictures are taken. In either case, upon completion of the roll of film, the film is rewound off the take-up reel back within the canister. The canister must then be sent for processing before the pictures are available. Other varieties of cameras such as 110 and 660 are similar except they use a self-contained film cartridge with a built-in take-up reel. The whole cartridge is sent in for developing.

More recently, digital cameras have proliferated in the marketplace. A typical digital camera employs an electronic image sensing array, such as a charge coupled device (CCD) or CMOS image sensing array, which communicates with the lens of the camera. When a picture is taken, the shutter opens and exposes an image sensing array to light. The image sensing array thereby captures the image which is then retrieved from the array and stored in a memory. The camera can be coupled to a laptop computer or a desktop computer to download the images stored in memory. In that way, the picture is immediately available for on-screen viewing.

Some attempts have been made to provide film cameras with the ability to take digital pictures. These efforts have generally involved construction of a large relatively heavy replacement back panel for the camera which contains the necessary electronics required to take digital pictures. This does not facilitate the ready transition between film and digital pictures as the camera back must be interchanged depending on the medium in which the pictures are to be taken. Changing the camera back is difficult, time consuming and, in many cases, requires the service of a camera technician.

In view of the foregoing, it would be desirable to have a device which permits existing film cameras to take one or more digital pictures without excessive cost. It would also be desirable if the camera could be easily switched between taking digital pictures and taking film pictures by the user without requiring any service department assistance.

BRIEF SUMMARY OF THE INVENTION

A method and apparatus for taking digital pictures is disclosed. A film camera having a standard back panel, a shutter, and a primary lens is provided. An image sensing array is disposed within the camera in an area normally occupied by film so as to be in optical communication with the primary lens when the shutter is open. A read-out circuit is packaged to reside in a cavity normally occupied by film when the camera is employed to take standard pictures. The read-out circuit is coupled to the image sensing array and reads out an image captured by the image sensing array. A memory is coupled to a read-out circuit to store images read from the image sensing array. The memory is packaged to also reside in a cavity vacated in the absence of film. In one embodiment, the read-out circuit and the memory occupy the same cavity. In another embodiment, the read-out circuit and the memory occupy different cavities.

DETAILED DESCRIPTION OF THE INVENTION

Figure 1:
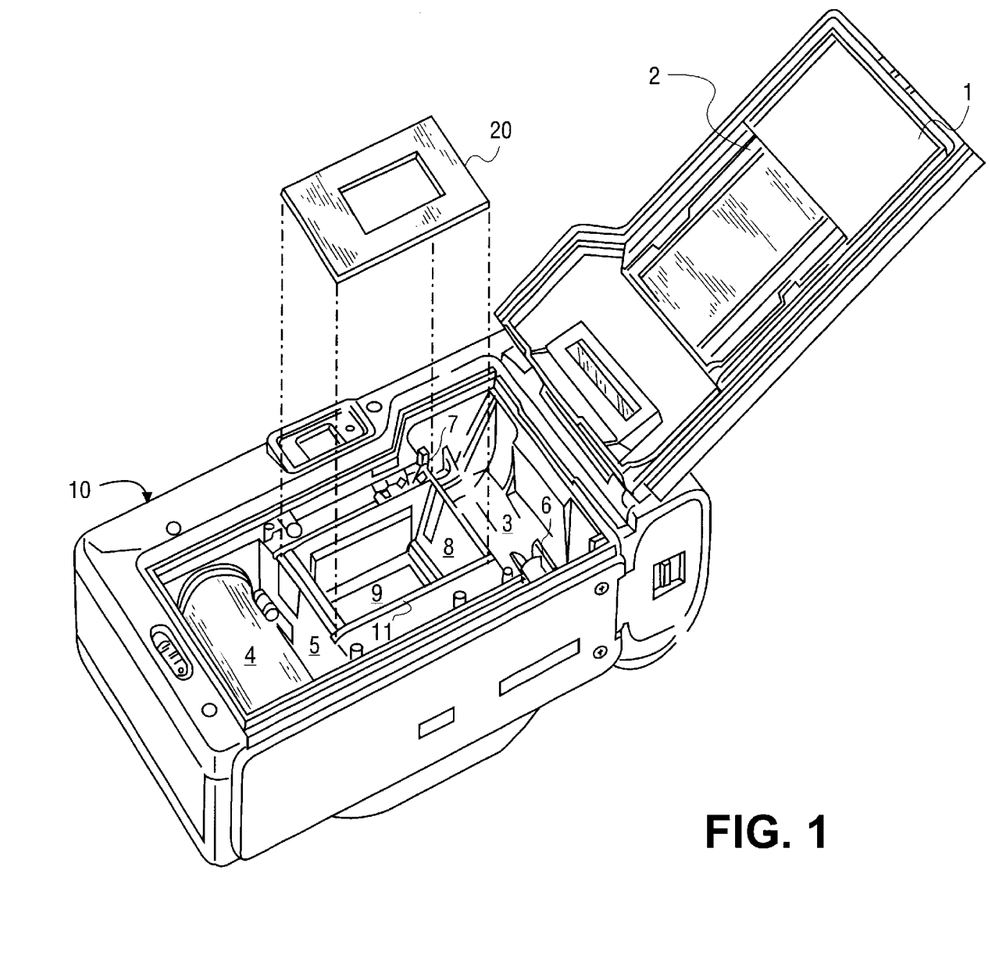
FIG. 1 is a perspective view of a camera for use with one embodiment of the invention.

FIG. 1 shows a perspective view of a camera for use with one embodiment of the invention. The 35mm camera 10 has a standard back panel 1 with a spring-loaded pressure plate 2 coupled thereto. When used with conventional film, the film canister resides in cavity 3 and engages return post 6. The film is disposed over cavity 8 so that when shutter 9 is open, the film is in optical communication with a primary lens not shown on the other side of shutter 9. Drive gear 7 engages perforations in the edge of the film to advance the film on to take-up reel 4. As more pictures are taken, more and more film is advanced onto take-up reel 4 and fills more and more of cavity 5 which surrounds take-up reel 4. The pressure plate 2 holds the film against the edges 11 of cavity 8, thereby defining the frame size of each exposure. When used with the invention to take digital pictures, the requisite electronics and memory are disposed in one or both of film canister cavity 3 and take-up reel cavity 5, while the image sensing array resides over cavity 8. In one embodiment, a secondary lens 20 is inserted into cavity 8 to focus the light entering shutter 9 onto a smaller area. Secondary lens 20 may engage the sides of cavity 8 or may be coupled to the carrier for an image sensing array (ISA) as discussed further below. This permits a smaller ISA to be used and, therefore, reduces the cost of the array.

Figure 2:
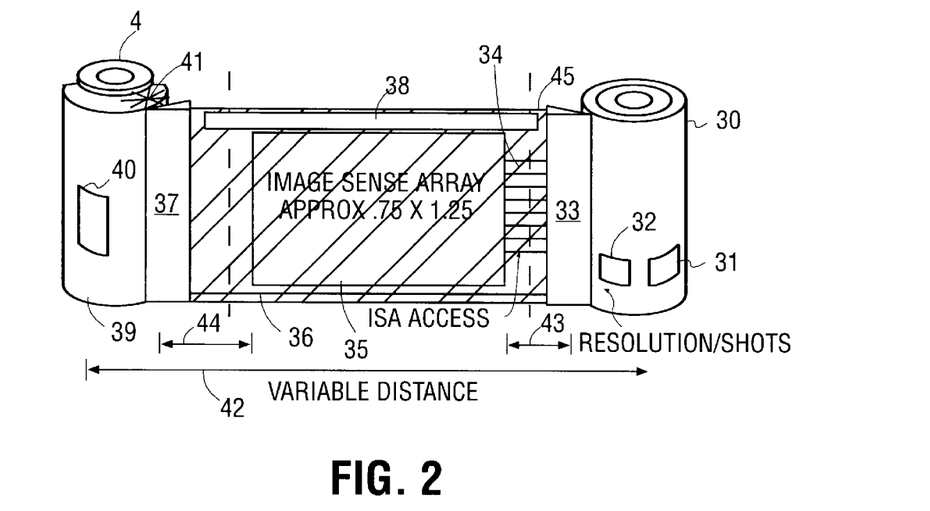
FIG. 2 is a back perspective view diagram of one embodiment of the invention.

FIG. 2 is a back perspective view diagram of one embodiment of the invention. A cylindrical image processing canister 30 shaped like a traditional film canister is provided to house image processing electronics discussed below in connection with FIGS. 4–7. Disposed on canister 30 is an image quality switch 32 which permits selection between resolution versus number of pictures which can be stored in the memory. The higher the resolution, the greater the memory required to store each picture. In some situations, a user may wish to give up some resolution in favor of more pictures before reloading. Switch 32 provides that capability.

In one embodiment, it is a four-position switch. In another embodiment, one switch controls resolution, and a second switch controls color depth. A programmable film speed indicator 31 is disposed on the cylinder to be read like the film speed indicators on conventional film to indicate the speed at which the camera can operate with the ISA 35 that is being used. This permits different ISAs to be used with the same image processing canister 30. When installed, canister 30 is disposed over return post 6 (of FIG. 1). Accordingly, canister 30 may be provided with a hollow area so as not to engage return post 6 such that the return post 6 is free to rotate unimpeded and without effecting the positioning of canister 30. Alternatively, canister 30 may engage return post 6 and be provided with a controlled friction wind mechanism to cause the camera to believe that the film has been successfully rewound or not as desired.

One problem faced in 35 mm cameras which does not exist in 110 or 660 cameras is that the center-to-center distance 42 between the center of the film canister when installed and the take-up reel is variable. Both the distance 43 between the film canister and the aperture and the distance 44 between the aperture and the take-up reel are themselves variable. Thus, to accommodate variable distance 43, canister 30 has connector 33 coupled thereto. Connector 33 provides a relatively long connector surface for any incoming signal lines. Accordingly, if the variable distance is short, the signal lines can be inserted deeper into connector 33, and if the variable distance is long, the signal lines can be inserted less deeply into connector 33 while still insuring appropriate contact An ISA 35 is mounted so that the sensing surface may be disposed in optical communication with the camera lens when the shutter is open. ISA 35 can typically be mounted on a carrier such as a circuit board. Cameras typically accommodate at least 2–3 millimeters between pressure plate 2 (referring to FIG. 1) and the top edge 11 of cavity 8 within the space that the ISD mounted on the circuit board will be disposed. Therefore, it is important that the thickness of the ISA/carrier combination not exceed 2–3mm if the combination is intended to be used in a broad spectrum of existing cameras. Using existing techniques, it is possible to get an ISA/circuit board combination of two millimeters in thickness. Moreover, ISAs come in a range of sizes such that a single ISA may be used in one embodiment. In another embodiment, smaller edge buttable ISAs are used to produce a single ISA of larger size. In still another embodiment alluded to above and discussed below, a smaller ISA is used in conjunction with secondary lens 20 to provide a lower cost solution.

ISA 35 is coupled to the canister 30 at connector 33 by image access lines 34. Memory housing 39 having data port 40 is to be disposed in cavity 5 about take-up reel 4 (take-up reel 4, while shown in FIG. 2, does not form a part of this invention). A film wind detector 41 engages take-up reel 4 and senses when a film advance has been initiated. Connector 37 is like connector 33, but will provide connection points for different signal lines. Significantly, this allows detachment and removal of the memory housing unit 39 from the ISA 35. Thus, memory units may be switched in and out, not unlike a regular roll of film. Memory access lines 36 couple canister 30 to memory housing 39. It is also anticipated that memory housing 39, in addition to housing the memory, will house a power supply which is a battery. In one embodiment, memory housing 39 is a half cylinder hollowed to accommodate the take-up reel 4.

In one embodiment, a tape backing 45 provides a backing for the image sense array 35 and the signal lines exiting therefrom. The tape backing 45 may be mylar or any other suitable material. The tape backing is prepared to engage connectors 33 and 37 so that tension is maintained and proper positioning of the image sensing array can be effected. Space 38 is provided in tape 45 to avoid interference with film drive gear 7.

Because of the variable distance issue discussed above, and the fact that the ISA is unlike regular 35mm film which has no pre-defined frames, steps must be taken to ensure that a user will properly position the ISA. To that end, it is desirable that there be some marking or gradation on the, e.g., tape backing to delineate by type of camera the depth of insertion appropriate. As one example, this may take the form of color bands and a package insert that advises the user which color band corresponds to which model of cameras.

Figure 3:
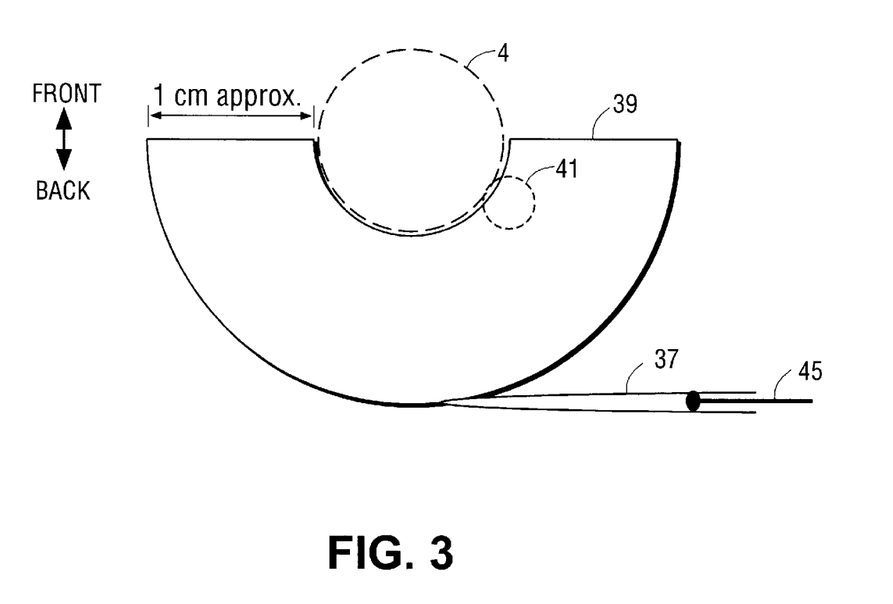
FIG. 3 is a top view of the memory housing of one embodiment of the invention.

FIG. 3 is a top view of the memory housing 39 of one embodiment of the invention. The film wind detector 41 is shown engaging take-up reel 4 which are both shown in phantom lines. Connector 37 is shown engaging tape backing 45.

Figure 4:
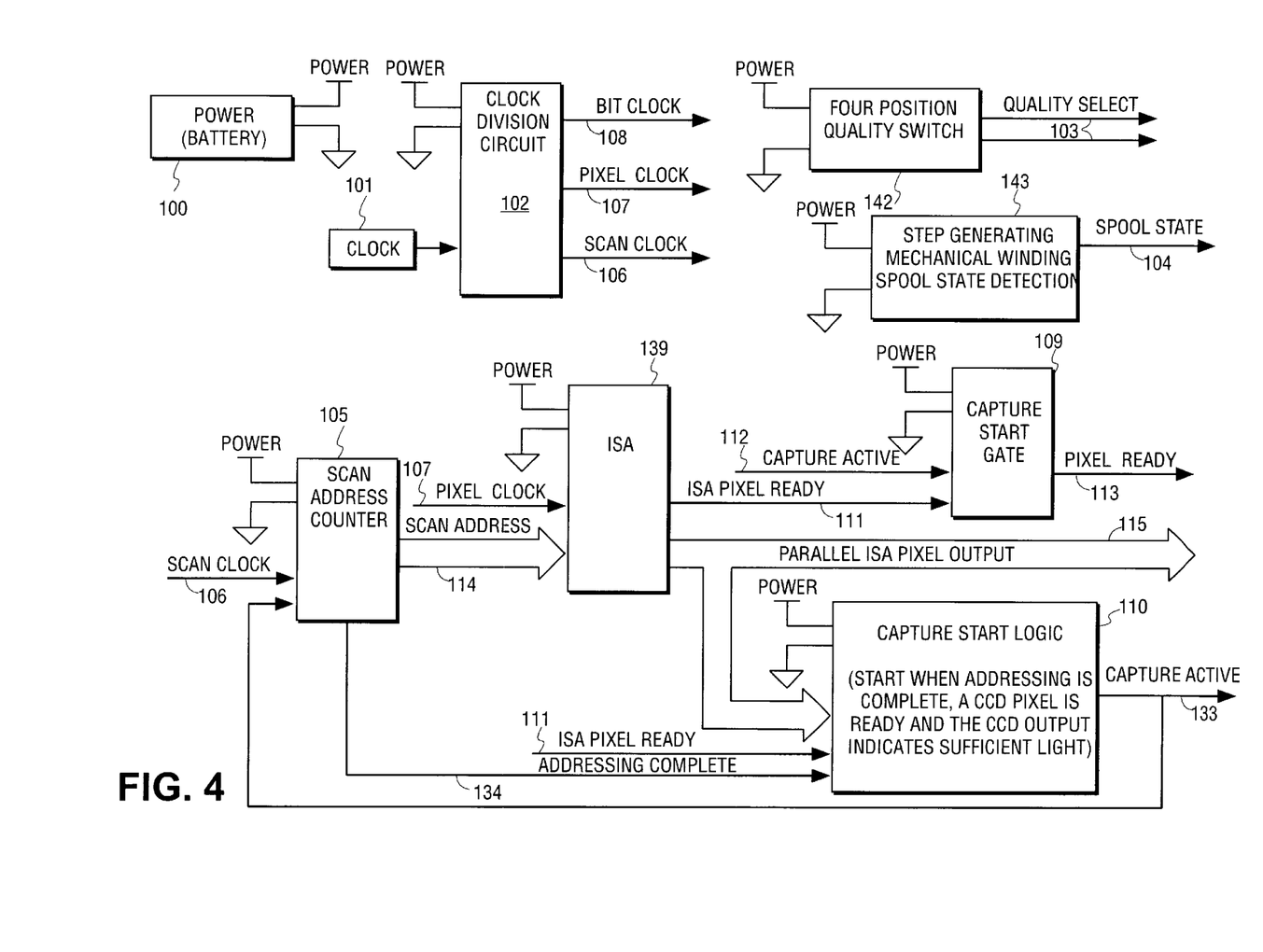
FIGS. 4–6 is a block diagram of one embodiment of the invention.
Figure 5:
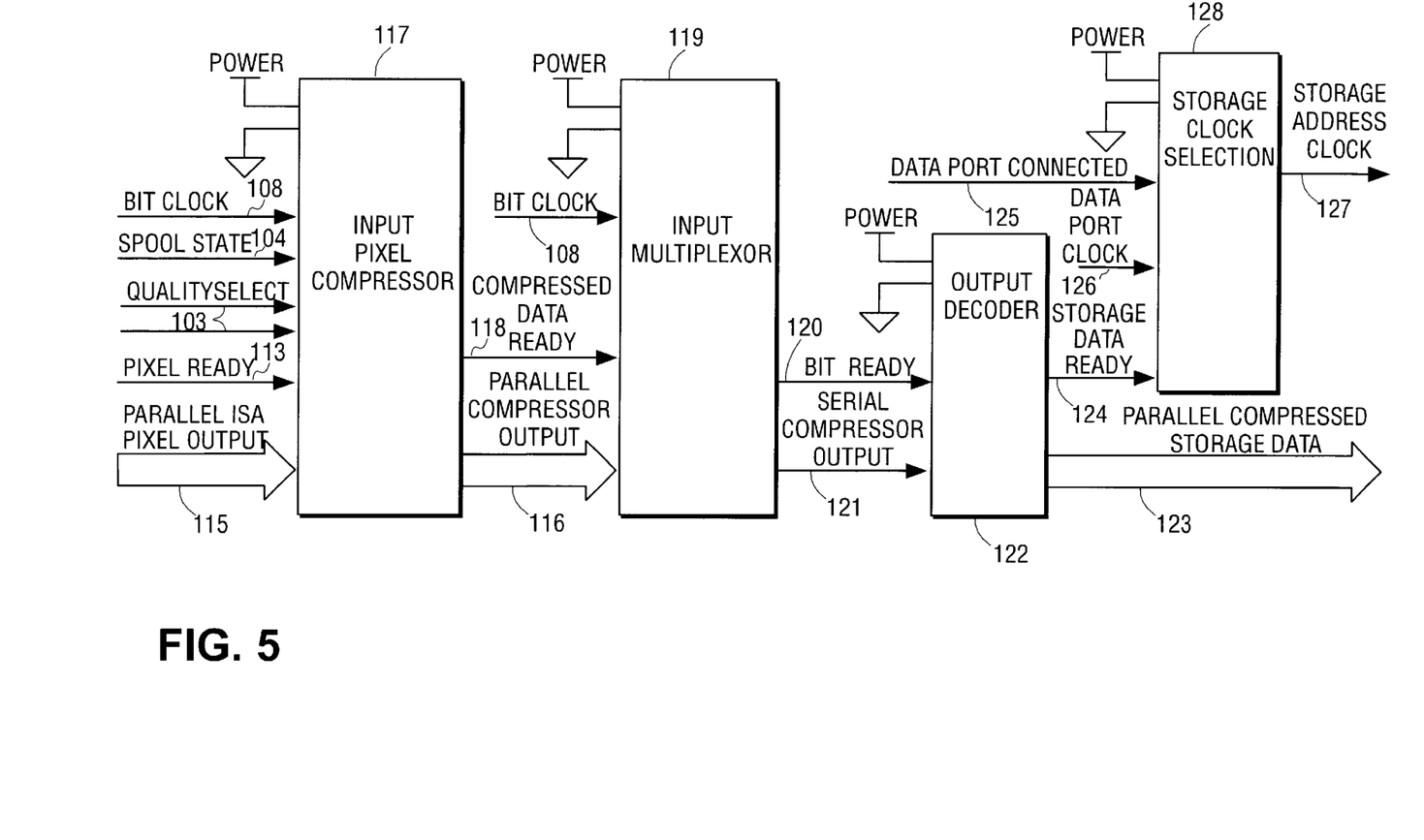
Figure 6:
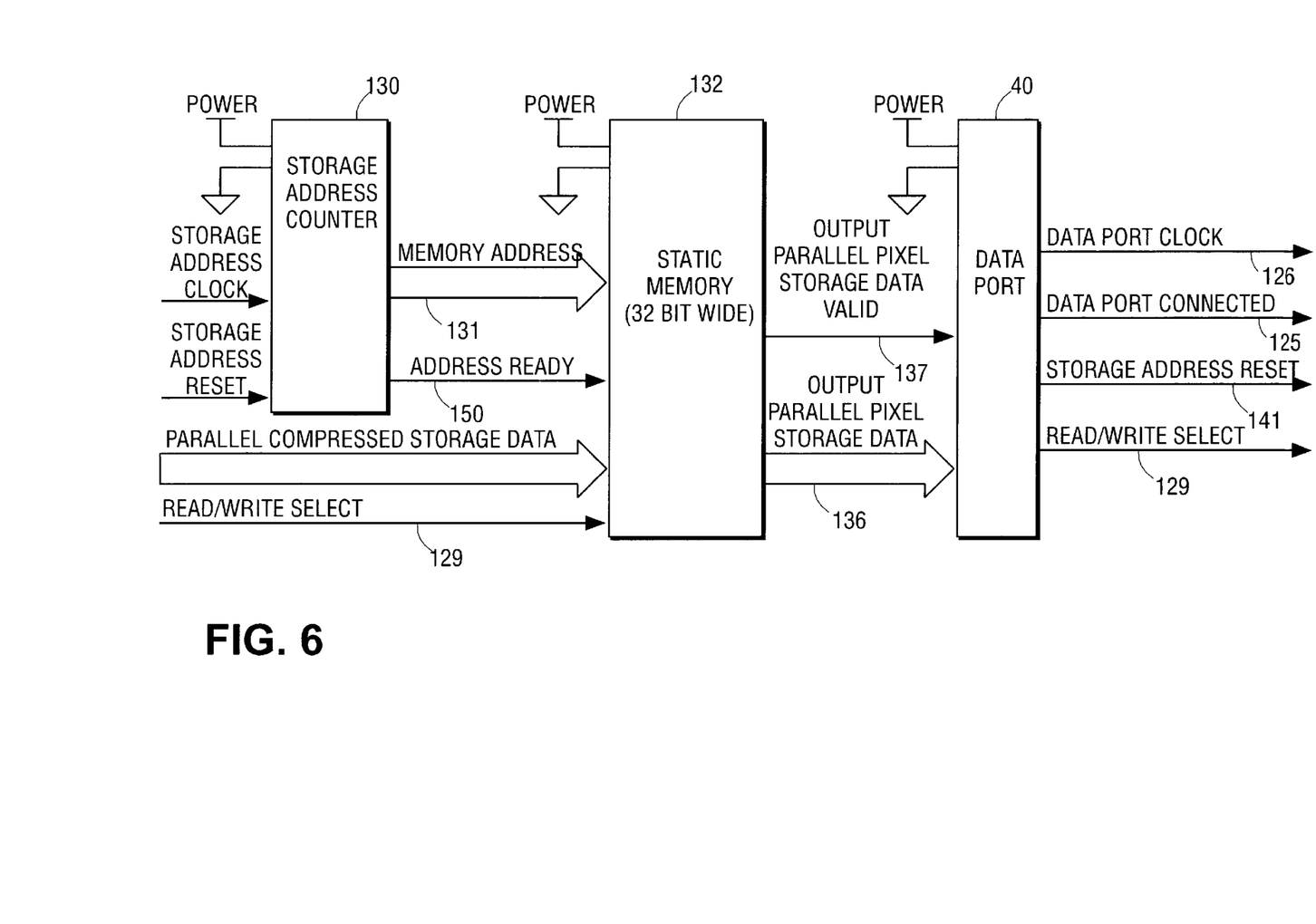

FIGS. 4–6 show a block diagram of one embodiment of the invention. A battery 100 provides power supply for the rest of the electronic components of the invention. A clock 101 is coupled to a clock division circuit 102. Clock 101 may be a suitable frequency crystal. The clock division circuit 102 converts the clock signal from the clock 101 into three clock signals, a bit clock 108, a pixel clock 107, and a scan clock 106. The frequency of the scan clock is determined by the time the clock must be asserted to read a scan line from the ISA 139. The pixel clock is the number of pixels in a scan line times faster than the scan clock, and the bit clock is at least the number of bits in a pixel line faster than the pixel clock. For example, assuming eight pixels in a scan line and eight bits in a pixel and that the scan clock has a frequency of one, the pixel clock and bit clock would have a frequency of eight and at least sixty-four, respectively. Switch 142 in this embodiment is a four-position quality select switch which generates two-bit quality select signal 103. Similarly, wind detection unit 143 generates a spool state signal 104.

A scan address counter 105 is responsive to scan clock 106 and addresses the ISA 139 along scan address lines 114. ISA 139 is responsive to pixel clock 107. Parallel pixel output 115 of the ISA 139 is fed into the capture start logic 110, along with the ISA pixel ready signal 111 and an addressing complete signal 134 generated by scan address counter 105. When the addressing complete signal 134 is asserted and the ISA pixel ready signal 115 is asserted, the capture start logic 110 determines from the parallel output 115 of the ISA 139 whether a picture has been taken. Effectively, the amount of light captured by the scan line indicates whether a picture has been taken, i.e., if the output light level exceeds a predetermined threshold, a picture has been taken. In one embodiment, an additional sensor is added to determine if the camera back is open. Opening the camera back would otherwise be interpreted as a picture taken because the ISA would exceed the light threshold. This sensor is particularly useful where it is desired to change the quality select setting "during the roll." For example, as the memory is filled up, a user may decide they want, e.g., three low resolution shots rather than a single additional high resolution shot. If opening the camera back results in a "picture," memory would be wasted defeating the benefit of changing the quality settings.

If a picture has been taken, the capture start logic asserts a capture active signal 133 at both capture start gate 109 and the scan address counter. This enables the count of the scan address counter 105. When capture active is not asserted, the scan address counter 105 merely repeatedly asserts one predetermined scan address. Usually, the scan line is in the middle of the ISA. This scan line forms a basis for the capture start logic determination of a picture taken. The capture start gate 109 is responsive to both the ISA pixel ready signal 111 and the capture active signal 112. When both are asserted, capture start gate asserts pixel ready signal 113 to the input pixel compressor shown in FIG. 5. In one embodiment, to improve power efficiency, the capture active signal 133 is used to disable all downstream units when it is deasserted.

While compression is not essential to the invention, because memory space is limited, compression will often be desirable. Input pixel compressor 117 is responsive to bit clock 108, a spool state signal 104, a quality select signal 103, and the pixel ready signal 111. The spool state signal 104 indicates the beginning of a new frame which should be tagged in memory to simplify downloading the frames from the memory at a later time. The quality select signals 103 contribute to the tag by defining the space that will be required to store the frame. The pixel ready signal 113 is used to signal the compressor 117 that a new image pixel is available on the parallel ISA pixel output signal lines 115. The compressor 117 also receives the parallel ISA pixel output signal lines 115. The input pixel compressor 117 compresses the parallel ISA pixel output as parallel compressor output 116, and it serves a compressed data ready signal 118 at input multiplexor 119. Input multiplexor 119 is also responsive to the bit clock 108 and serializes the parallel compressor output 116 as serial compressor output 121. It is important that the bit clock be sufficiently fast to permit the compressor to compress the incoming data on the parallel pixel output lines 115. The bit clock 108 should also be an integral multiple of the pixel clock 107. Input multiplexor 119 also asserts a bit ready signal 120. Both the bit ready signal 120 and the serial compressor output 121 are provided to the output decoder 122 which transforms the serial bit stream into parallel compressed data and asserts the storage data ready signal 124. The parallel compressed data is transmitted on parallel compress storage data lines 123 to static memory 132 (shown in FIG. 6).

A storage clock selection unit 128 senses connection to the data port 40 through the data port connects signal 125. When the data port 40 is connected, the external clock signal is provided as data port clock 126. The data storage clock selection unit 128 selects between the data port clock 126 and the data storage ready signal 124 to assert as the storage address clock 127. Storage address counter 130 addresses the memory 132 via memory address lines 131, and also generates an address ready signal 150. A read/write signal 129 is provided by the data port with a default to a write signal. The data port 40 receives the data stored in the memory along parallel output pixel storage data lines 136 and also asserts a data valid signal 137 to advise a downloading computer (not shown) whether the output data is valid.

Figure 7:
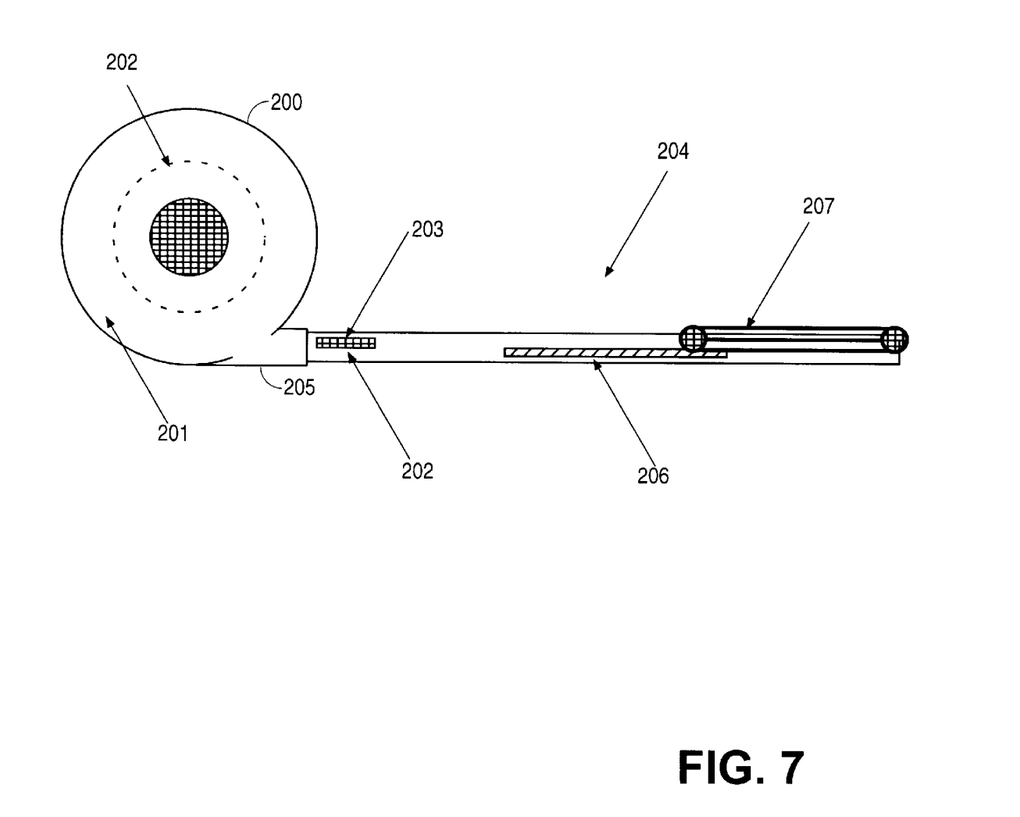
FIG. 7 is a top view of an alternative embodiment of the invention.

FIG. 7 is a top view of an alternative embodiment of the invention. In this embodiment, a single canister 200 has memory distributed around an outer cylinder 201. The memory may be, for example, flash memory. The hollow center core of the cylinder is constructed to accept a nonproprietary three-volt battery to power the memory and other required electronics. Connector 205 connects the carrier 204 which carries an image processing chip 203 and a JPEG compression chip 202. The image processing chip 203 retrieves captured images from image sensor array 206. Auto winds sprocket treadmill 207 is attached to the carrier 204 and engages winding gears and a camera to simulate film.

Figure 8:
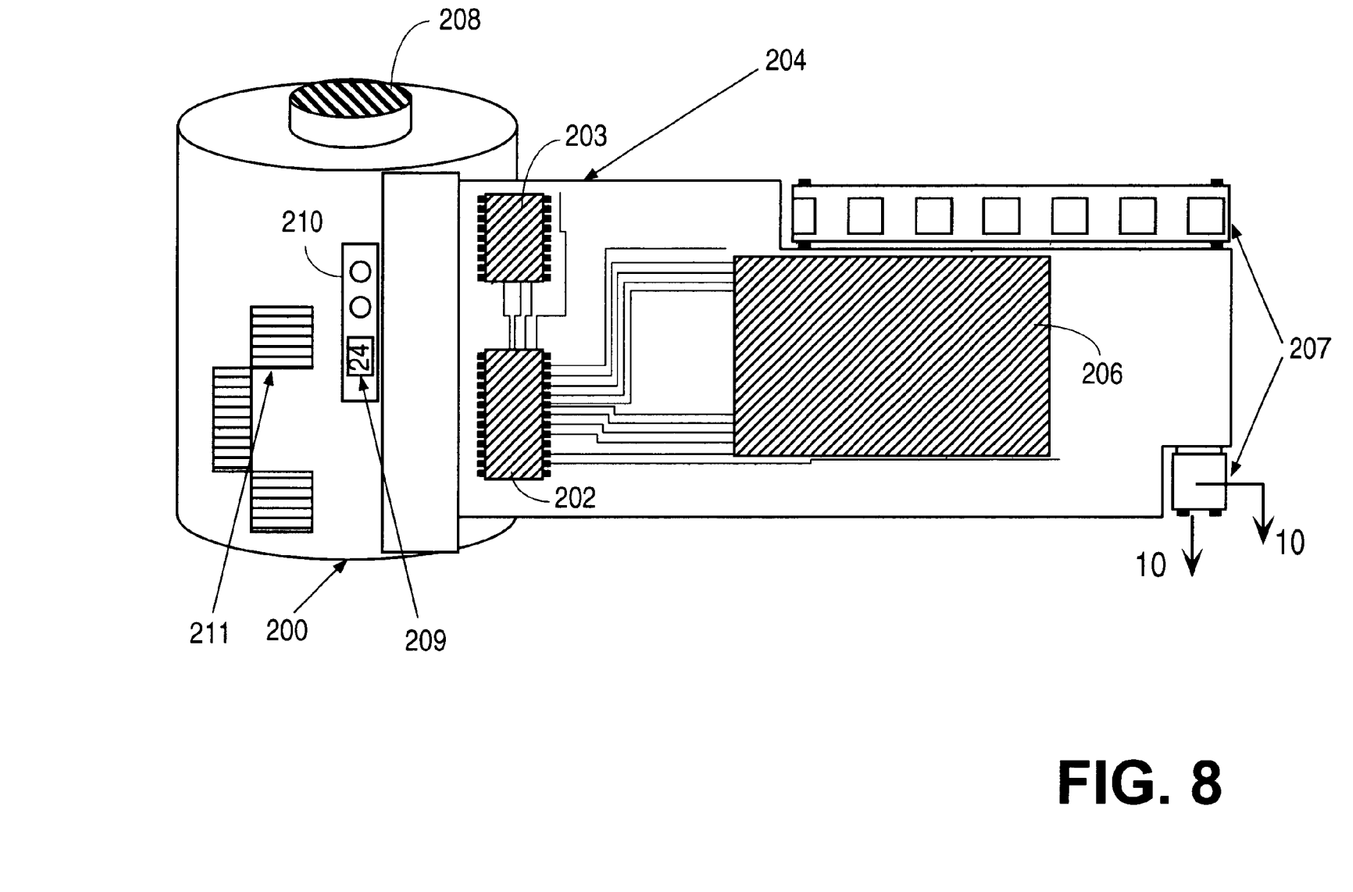
FIG. 8 is a perspective rear view of the alternative embodiment of the invention of FIG. 7.

FIG. 8 is a back perspective view of the alternative embodiment of the invention of FIG. 7. In this figure, data port 210 is shown disposed on canister 200. A wind sensor 208 for detecting a rewind condition is also disposed on canister 200. Programmable speed indicators 211 are on the canister to be read by the camera in the conventional manner. A data port 210 is provided to allow easy downloading of images stored in the memory. Additionally, a liquid crystal display (LCD) 209 is disposed on the canister 200 so as to be readable through a window provided in many camera back panels. The LCD 209 may, e.g., display the number of shots remaining at the current resolution level. The treadmill 207 is also shown. The treadmill 207 advances similar to regular film so that the camera believes it has advanced regular film. There are a number of ways an "end of roll" condition can be handled. In one embodiment, operation of the treadmill 207 is constant as between any two pictures. In this embodiment, the user must recognize by, e.g., the LCD 209 display that a maximum number of shots has been taken. Other signaling mechanisms / such as an audible tone may be used to indicate the memory is full. The user must then take steps to empty the memory. It is desirable to ensure that the memory will not overwrite itself if the number of pictures taken exceeds the capacity of the memory.

Figure 10:
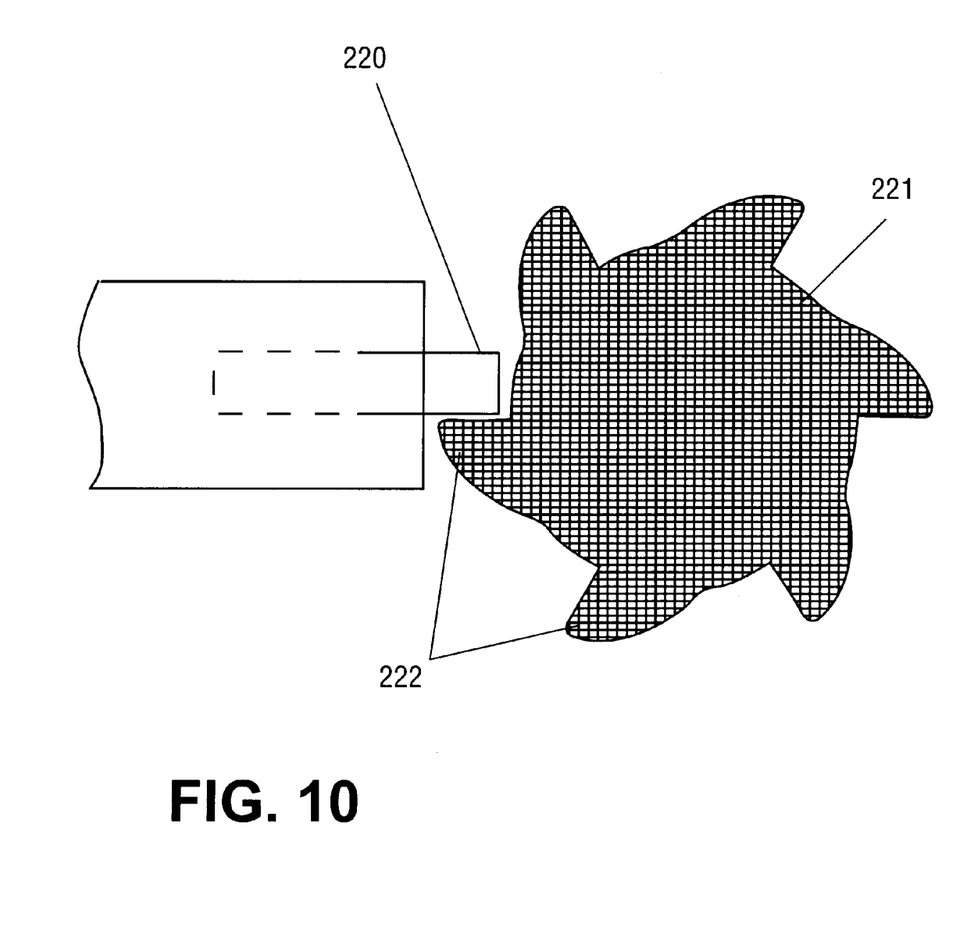
FIG. 10 is a cross-section view of one mechanical stop for use in the embodiment of FIG. 8.

In an alternative embodiment, a mechanical stop mechanism prevents advancement of the treadmill 207 after a last shot is taken. FIG. 10 is a cross-sectional view of one such mechanical stop. When a last picture is taken, pin 220 is triggered to engage sprockets 222 of a treadmill axle 221. Pin 210 engages the sprockets 222 so as to prevent advancement, but permits auto rewind to occur unhampered. Once auto rewind begins, pin 10 is reset to a disengaged position. Other ways of increasing treadmill tension to simulate the "end of roll" condition will occur to those of ordinary skill in the art and are within the scope and contemplation of the invention.

Figure 9:
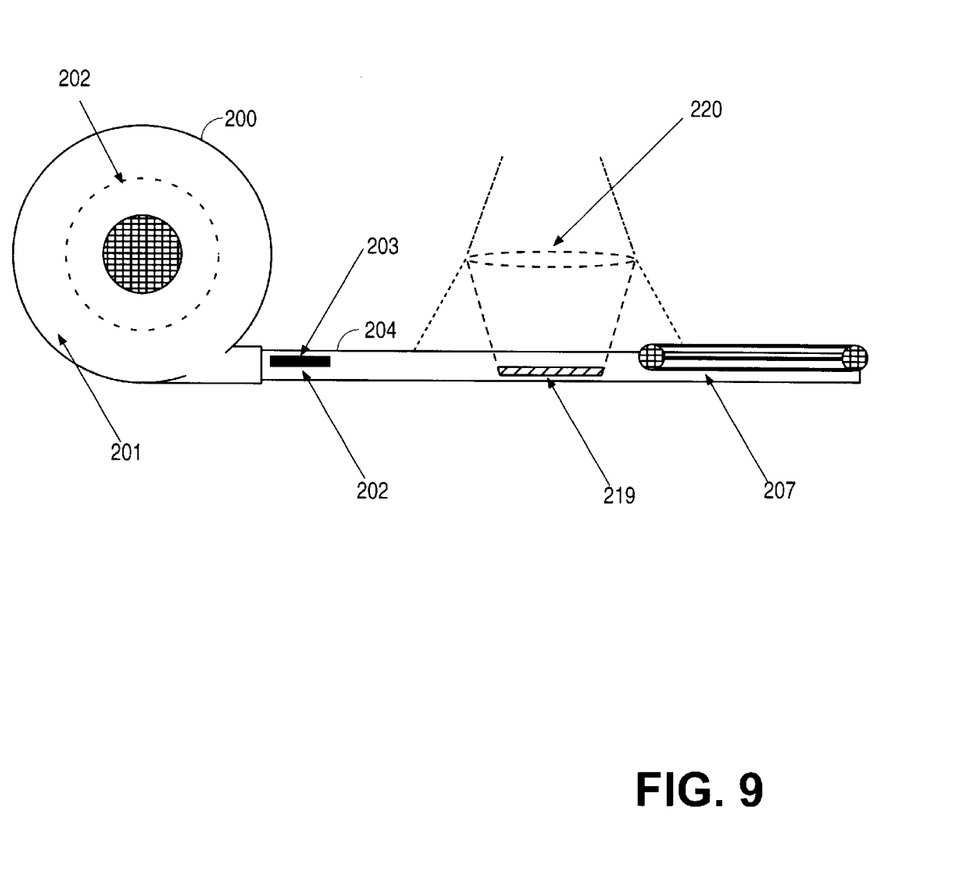
FIG. 9 is a top view of a second alternative embodiment of the invention.

FIG. 9 is a top view of a second alternative embodiment of the invention. This embodiment is similar in most respects to the embodiment of FIG. 7. However, the secondary lens 220 extends from carrier 204 to focus light entering the camera onto ISA 219 which has a smaller area than a typical film frame. Secondary lens 220 should be affixed to carrier 204 to ensure that the appropriate focal length between the secondary lens 220 and the ISA 219 is maintained. This embodiment will only be suitable for cameras in which the shutter is set significantly forward of the film plane such as the camera shown in FIG. 1. It is expected that the smaller ISA 219 will significantly reduce the cost of the overall apparatus.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus for converting a film camera to a digital camera, the apparatus comprising:

an image sensing array;

a read-out circuit coupled to the image sensing array;

a treadmill to engage a take up reel in the camera; and a resolution selector coupled to the read-out circuit to form an image processing module which allows a user to select one of a plurality of resolutions for the digital picture and process the digital picture based on a resolution selected by the user before the digital picture is stored in memory;

wherein the memory and the image processing module are packaged to be retained in a space vacated in the absence of film in the camera, and wherein the apparatus is easily installable in the film camera so that the image sensing array is in optical communication with a lens when a shutter of the film camera is open.

2. The apparatus of claim 1 further comprising:

a power supply coupled to the memory and a date port coupled to the memory for retrieving images stored in the memory.

3. The apparatus of claim 2 wherein the memory, the data port, and power supply comprise a cartridge, the cartridge being detachable from the image processing module and image sensing array such that cartridges can be switched in and out.

4. The apparatus of claim 1 further comprising:

a mechanical stop that engages the treadmill responsive to a memory full condition to stimulate an end of roll condition.

5. An apparatus for converting a film camera to a digital camera, the apparatus comprising:

an image sensing array;

a read-out circuit coupled to the image sensing array;

a memory coupled to the read-out circuit, the memory for storing a digital picture derived from an image read-out from the image sensing array;

a sensor coupled to the readout circuit, the sensor for detecting and signaling when the camera back is open, such that based on the detecting and signaling data stored on the image sensing array while the camera back is open is not read-out by the read-out circuit as a digital image and not stored in the memory when the camera back is open; and wherein the memory and the read-out circuit are packaged to be retained in a space vacated in the absence of film in the camera and wherein the apparatus is easily installable in the film so that the image sensing array is in optical communication with a lens when a shutter of the film camera is open.

6. An apparatus for converting a film camera to a digital camera, the apparatus comprising:

an image sensing array;

a read-out circuit coupled to the image sensing array;

a memory coupled to the read-out circuit, the memory for storing a digital picture derived from an image read-out from the image sensing array;

a sensor for detecting and signaling to the readout circuit a film advance condition, the sensor signal further tagging a new frame in the memory; and wherein the memory and the read-out circuit are packaged to be retained in a space vacated in the absence of film in the camera and wherein the apparatus is easily installable in the film camera so that the image sensing array is in optical communication with a lens when a shutter of the film camera is open.

7. An apparatus comprising:

a film camera having a back panel and a lens;

an image sensing array disposed within the back panel so as to be in optical communication with the lens of the camera when a shutter of the camera is open;

a read-out circuit coupled to the image sensing array and reading an image captured responsive to a signal;

a treadmill to engage a take up reel in the camera;

memory coupled to the read-out circuit which stores a digital picture derived from the image read-out by the read-out circuit responsive to the signal; and a resolution selector coupled to the read-out circuit to form an image processing module which allows a user to select one of a plurality of resolutions for the digital picture and process the digital picture based on a resolution selected by the user before the digital picture is stored in memory;

wherein the memory and the image processing module are disposed in cavities vacated in the absence of film.

8. The apparatus of claim 7 wherein the image sensing array is smaller in area than a frame of conventional film for the camera and further comprising:

a secondary lens, the secondary lens focusing light entering the shutter on to an area approximately a size of the image sensing array.

9. The apparatus of claim 7 further comprising:

a power supply coupled to the memory and a data port coupled to the memory for retrieving images stored in the memory.

10. The apparatus of claim 9 wherein the memory, the data port, and power supply comprise a cartridge, the cartridge being detachable from the readout circuit and image sensing array such that cartridges can be switched in and out.

11. The apparatus of claim 7 wherein the camera is one of 35 mm, 110, and 660.

12. The apparatus of claim 7 further comprising:

a mechanical stop that engages the treadmill responsive to a memory full condition to simulate an end of roll condition.

13. An apparatus comprising:

a film camera having a back panel and a lens;

an image sensing array disposed within the back panel so as to be in optical communication with the lens of the camera when a shutter of the camera is open;

a read-out circuit coupled to the image sensing array and reading an image captured responsive to a signal;

a memory coupled to the read-out circuitry which stores a digital picture derived from the image read-out by the read-out circuit responsive to the signal;

a sensor coupled to the readout circuit, the sensor for detecting and signaling when the camera back is open, such that based on the signaling and detecting data stored on the image sensing array while the camera back is open is not read-out by the read-out circuit as a digital image and not stored in the memory when the camera back is open; and wherein both the memory and the read-out circuit are disposed in cavities vacated in the absence of film.

14. An apparatus comprising:

a film camera having a back panel and lens;

an image sensing array disposed within the back panel so as to be in optical communication with the lens of the camera when a shutter of the camera is open;

a read-out circuit coupled to the image sensing array and reading an image captured responsive to a signal;

a memory coupled to the read-out circuit which stores a digital picture derived from the image read-out by the read-out circuit responsive to the signal;

a sensor for detecting and signaling to the readout circuit a film advance condition, the sensor signal further tagging a new frame in the memory; and wherein both the memory and the read-out circuit are disposed in cavities vacated in an absence of film.

15. A method of taking a digital picture with a film camera comprising the steps of:

loading an image sensing array to be in optical communication with a lens of the camera when a shutter is open;

inserting a memory unit and an image processing module including a read-out circuit, a treadmill and a resolution selector into at least one cavity in the camera such that the treadmill engages a take up reel in the camera;

exposing the image sensing array by opening the shutter;

reading the image array to acquire image data;

processing the image data within the image processing module based on a resolution selected by a user; and storing the image data in the memory unit at the resolution determined by the user.

16. The method of claim 15 further comprising:

reading a line of the image sensing array; and comparing a light level at the line with a threshold level indicating a picture has been taken such that the image sensing array is polled to determine if it has been exposed.

17. The method of claim 15 further comprising the step of:

inserting a secondary lens between the shutter and the image sensing array, wherein the image sensing array is smaller in area than film used in the camera and wherein the secondary lens focuses light entering through the shutter on the smaller area.

18. The method of claim 15 further comprising the step of:

inserting a sensor for determining and signaling when the camera back is open, such that no data is stored in memory when the camera back is open.

19. An apparatus for converting a film camera to a digital camera, the apparatus comprising:

an image sensing array;

a read-out circuit coupled to the image sensing array;

a memory coupled to the read-out circuit, the memory for storing a digital picture derived from an image read-out from the image sensing array;

a sensor for detecting a film advance condition;

a treadmill to engage a take up reel in the camera; and wherein the memory and the read-out circuit are packaged to be retained in a space vacated in the absence of film in the camera and wherein the apparatus is easily installable in the film camera so that the image sensing array is in optical communication with a lens when a shutter of the film camera is open.

20. The apparatus of claim 19 further comprising:

a mechanical stop that engages the treadmill responsive to a memory full condition to simulate an end of roll condition.

* * * * *